US007006994B1

(12) United States Patent
Campbell et al.

(10) Patent No.: US 7,006,994 B1
(45) Date of Patent: Feb. 28, 2006

(54) AUTOMATED RECEIVABLES MANAGEMENT SYSTEM

(75) Inventors: Stephen James Campbell, Manassas, VA (US); Robert Owen Kramer, McLean, VA (US); Jame Cofran, Annapolis, MD (US); Randall S. Wellons, Washington, DC (US)

(73) Assignee: American Management Systems, Inc., Fairfax, VA (US)

( * ) Notice: Subject to any disclaimer, the term of this patent is extended or adjusted under 35 U.S.C. 154(b) by 638 days.

(21) Appl. No.: 09/356,047

(22) Filed: Jul. 16, 1999

(51) Int. Cl.
*G06F 17/60* (2006.01)
(52) U.S. Cl. ...................................................... 705/40
(58) Field of Classification Search .................. 705/40
See application file for complete search history.

(56) References Cited

U.S. PATENT DOCUMENTS

| | | | |
|---|---|---|---|
| 4,736,294 A | 4/1988 | Gill et al. .................... | 364/408 |
| 5,025,138 A | 6/1991 | Cuervo ........................ | 235/379 |
| 5,083,270 A | 1/1992 | Gross et al. ................ | 364/408 |
| 5,262,941 A | 11/1993 | Saladin et al. .............. | 364/408 |
| 5,341,412 A | 8/1994 | Ramot et al. ................. | 379/92 |
| 5,436,965 A | 7/1995 | Grossman et al. .......... | 379/266 |
| 5,499,291 A | 3/1996 | Kepley ........................ | 379/265 |
| 5,550,734 A | 8/1996 | Tarter et al. ............. | 364/401 R |
| 5,561,711 A | 10/1996 | Muller ........................ | 379/266 |
| 5,621,790 A | 4/1997 | Grossman et al. .......... | 379/266 |
| 5,644,633 A | 7/1997 | Kaufeld et al. ............. | 379/355 |
| 5,644,726 A | 7/1997 | Oppenheimer .............. | 395/238 |
| 5,644,727 A | 7/1997 | Atkins ........................ | 395/240 |
| 5,689,650 A | 11/1997 | McClelland et al. ........ | 395/236 |
| 5,699,528 A * | 12/1997 | Hogan .......................... | 705/40 |
| 5,704,044 A | 12/1997 | Tarter et al. ................. | 395/204 |
| 5,761,441 A | 6/1998 | Bennett ....................... | 395/235 |
| 5,765,144 A | 6/1998 | Larche et al. ................. | 705/38 |
| 5,784,452 A | 7/1998 | Carney ........................ | 379/265 |
| 5,802,161 A | 9/1998 | Svoronos et al. ........... | 379/216 |
| 5,819,230 A | 10/1998 | Christie et al. ................ | 705/4 |

(Continued)

FOREIGN PATENT DOCUMENTS

WO      WO 99/33010       7/1999

(Continued)

OTHER PUBLICATIONS

CACS Telecom Profile (Jul. 1998), pp. 1-24.

(Continued)

*Primary Examiner*—Charles R. Kyle
(74) *Attorney, Agent, or Firm*—Staas & Halsey LLP

(57) ABSTRACT

An automated receivables management system that provides a self-service collection environment using an electronic network, such as the Internet or a PCS, as a medium for communication and transaction execution. Comprehensive collections services are provided in a fully automated fashion, including account decisioning, treatment specification, communication channel specification, and communication to the customer and method for payment/response from the customer using the electronic channel. The electronic network operates as a fully-automated electronic receivables environment, providing a medium for notification, receiving funds and customer responses, while allowing the creation of a test and control environment for experimentation on a customer level. Using results from existing policies or strategies, the system matches account performance with account history in order to determine the optimal new strategy for interacting with the respective account(s). This process not only determines the optimal strategy, but can automatically apply the strategy to the account(s) that meets the appropriate criteria. This forms an environment to test new strategies and incorporate new learning in a new strategy creation without human intervention.

22 Claims, 7 Drawing Sheets

U.S. PATENT DOCUMENTS

| | | | |
|---|---|---|---|
| 5,832,460 A * | 11/1998 | Bednar et al. | 705/27 |
| 5,839,118 A | 11/1998 | Ryan et al. | 705/36 |
| 5,870,720 A | 2/1999 | Chusid et al. | 705/38 |
| 5,875,437 A | 2/1999 | Atkins | 705/40 |
| 5,878,404 A | 3/1999 | Stout, Jr. et al. | 705/38 |
| 5,889,799 A | 3/1999 | Grossman et al. | 379/266 |
| 5,903,879 A | 5/1999 | Mitchell | 705/38 |
| 5,930,775 A | 7/1999 | McCauley et al. | 705/38 |
| 5,966,693 A | 10/1999 | Burgess | 705/4 |
| 5,966,700 A | 10/1999 | Gould et al. | 705/38 |
| 5,978,780 A | 11/1999 | Watson | 705/40 |
| 5,991,733 A * | 11/1999 | Aleia et al. | 705/8 |
| 6,006,207 A | 12/1999 | Mumick et al. | 705/38 |
| 6,016,479 A * | 1/2000 | Taricani et al. | 705/19 |
| 6,016,482 A | 1/2000 | Molinari et al. | 705/35 |
| 6,041,315 A * | 3/2000 | Pollin | 705/45 |
| 6,044,355 A | 3/2000 | Crockett et al. | 750/8 |
| 6,044,362 A * | 3/2000 | Neely | 705/34 |
| 6,067,533 A | 5/2000 | McCauley et al. | 705/38 |
| 6,073,104 A | 6/2000 | Field | 705/1 |
| 6,078,907 A * | 6/2000 | Lamm | 705/40 |
| 6,098,052 A | 8/2000 | Kosiba et al. | 705/40 |
| 6,128,603 A * | 10/2000 | Dent et al. | 705/40 |
| 6,493,685 B1 * | 12/2002 | Ensel et al. | 705/40 |
| 2002/0059139 A1 * | 5/2002 | Evans | |

FOREIGN PATENT DOCUMENTS

| | | |
|---|---|---|
| WO | WO 99/59084 | 11/1999 |
| WO | WO 00/11574 | 3/2000 |
| WO | WO 00/28445 | 5/2000 |
| WO | WO 00/33226 | 6/2000 |
| WO | WO 00/34889 | 6/2000 |
| WO | WO 00/49552 | 8/2000 |
| WO | WO 00/54186 | 9/2000 |
| WO | WO 00/54199 | 9/2000 |
| WO | WO 00/60487 | 10/2000 |
| WO | WO 00/62209 | 10/2000 |
| WO | WO 00/62219 | 10/2000 |
| WO | WO 00/65502 | 11/2000 |
| WO | WO 00/65508 | 11/2000 |
| WO | WO 01/04810 A1 | 1/2001 |
| WO | WO 01/08039 A2 | 2/2001 |
| WO | WO 01/09782 A2 | 2/2001 |
| WO | WO 01/13295 A1 | 2/2001 |
| WO | WO 01/15047 A1 | 3/2001 |
| WO | WO 01/24095 A1 | 4/2001 |
| WO | WO 01/25997 A2 | 4/2001 |
| WO | WO 01/27832 A1 | 4/2001 |
| WO | WO 01/29692 A2 | 4/2001 |
| WO | WO 01/33461 A1 | 5/2001 |
| WO | WO 01/39005 A2 | 5/2001 |
| WO | WO 01/41011 A2 | 6/2001 |

OTHER PUBLICATIONS

CACS Plus Product Profile (Client/Server Version) pp. 1-28.
CACS Enterprise Product Profile, pp. 1-31.
American Management Systems, "Customer Decision Strategies", 1998.
Sidney Hill, Jr., "Solvemydebt Search on Dialog 411" (Feb. 3, 2003) from DIALOG(R) File 9:Business & Industry (R) (c) 2003 Resp. DB Svcs. All rts. reserv.

* cited by examiner

AUTOMATED RECEIVABLES MANAGEMENT SYSTEM

CROSS-REFERENCE TO RELATED APPLICATIONS

This application is related to U.S. application entitled DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, incorporated herein by reference.

This application is related to U.S. application entitled SIMULTANEOUS CUSTOMER/ACCOUNT STRATEGY EXECUTION IN A DECISION MANAGEMENT SYSTEM, U.S. Ser. No. 09/216,985, filed Dec. 21, 1998, incorporated herein by reference.

This application is related to U.S. application entitled USE OF ONLINE ANALYTICAL PROCESSING (OLAP) IN A RULES BASED DECISION MANAGEMENT SYSTEM, U.S. Ser. No. 09/217,016, filed Dec. 21, 1998, incorporated herein by reference.

This application is related to U.S. application entitled VERSIONING IN A RULES BASED DECISION MANAGEMENT SYSTEM, U.S. Ser. No. 09/219,341, filed Dec. 23, 1998, incorporated herein by reference.

This application is related to U.S. application entitled PARAMETER HIERARCHY FOR A DECISION MANAGEMENT SYSTEM, U.S. Ser. No. 09/219,340, filed Dec. 23, 1998, incorporated herein by reference.

This application is related to U.S. application entitled DECISION MANAGEMENT SYSTEM WHICH IS CROSS-FUNCTION, CROSS-INDUSTRY AND CROSS-PLATFORM, U.S. Ser. No. 09/219,338, filed Dec. 23, 1998, incorporated herein by reference.

This application is related to U.S. application entitled DECISION MANAGEMENT SYSTEM PROVIDING QUALITATIVE ACCOUNT/CUSTOMER ASSESSMENT VIA POINT IN TIME SIMULATION, U.S. Ser. No. 09/258,348, filed Feb. 26, 1999, incorporated herein by reference.

This application is related to U.S. application titled COLLECTOR'S ACCOUNT PAYMENT PROMISE OPTION ADVISORY APPARATUS AND METHOD, U.S. Ser. No. 09/356,048, filed Jul. 16, 1999, incorporated herein by reference.

This application is related to U.S. application titled DECISION MANAGEMENT SYSTEM WITH AUTOMATED STRATEGY OPTIMIZATION, U.S. Ser. No. 09/348,161, filed Jul. 7, 1999, incorporated herein by reference.

BACKGROUND OF THE INVENTION

The present invention relates to an automated collection system for monitoring customer accounts, identifying delinquent, overlimit or special status accounts, and automatically initiating collection activities including sending electronic messages, such as e-mail, and populating associated web pages allowing electronic responses. The present invention also enables an automatic testing system to analyze the effectiveness of the various collection activities and modify system behavior based on the analysis.

Software-based collection systems, such as the AMS CACS® system (described below) manage a series of activities related to recovering outstanding debts from customers. The collection system receives the customer segment from the central decision engine, and the general strategy to be deployed. The collection system then manages the exact workflow, processes and interactions between the institution and the customer.

Computer assisted credit management systems, including computer assisted collections, are known in the art. Generally, a collection system includes a variety of components, such as a Collection Engine, a Decision Engine, a User Interface (for either a collector or customer), and other components. A collector is a user of a collection system whose primary job is to use a collection system to facilitate collecting payments on accounts needing collection action, such as delinquent, overlimit or special status accounts, overlimit accounts, special status accounts, etc. Collection systems generally include parameters, such as collection policy parameters. Collection policy parameters are used by credit granting institutions to specify how a collection system implements the collection policy of the credit granting institution.

Examples of computer assisted collections systems include the Computer Assisted Collection System (or CACS®), by American Management Systems, Inc (AMS®), and its several versions including CACS Enterprise, Computer Assisted Collection System for Government (including TRACE), and CACS-Telecom. CACS Enterprise is explained in a document available from AMS entitled *CACS Enterprise Product Profile*, March 1998 by AMS, incorporated herein by reference. CACS Enterprise, currently at version 7.0, is a member of the AMS series of credit management software that supports all phases of credit operations, from initial application processing through servicing and accounting to collection. Each system can be installed individually, collectively, or in any combination to address evolving support requirements.

A Computer Assisted Collection System for Government is explained in *CACSPlus Product Profile (Client/Server version)*, August 1997, available from AMS, and incorporated herein by reference. The CACS-Telecom product is explained in *CACS-Telecom Product Profile*, September 1998, available from AMS and incorporated herein by reference. In addition, there are mainframe versions of CACS having a 3270 interface thereto, such as TRACE.

Software-based collection systems use a variety of commercially available software-based decision management tools, such as the STRATA® system from American Management Systems. STRATA applies predictive modeling techniques to customer data.

Automated test and learn systems such as the Rapid Strategy Evolution™ (RSE) may be used by computer assisted collection systems to identify the most effective offer from test and control strategies, and allow the creation of hybrid collection strategies that may be more effective than any of the individual tests. RSE Further advances controlled testing by tracking impact on specific test group segments, and supports immediate identification of the strongest and weakest elements within an overall strategy. Rapid Strategy Evolution is explained in such documents as *Customer Decision Strategies*, available from AMS and based on a presentation of the Jul. 31, 1997 Consumer Value Management Seminar.

Applicants also note that an advertised system SolveMyDebt.com may provide further background material. The system (not available) is described as a debtor initiated Internet collection system, which can interface with current collection and servicing systems to facilitate collections. Capabilities claimed include ability to view bills and debts over the Internet.

Current software-based collection systems manage a series of activities related to collecting outstanding debts from customers. Known collection systems generally receive account decisions, from a decision support engine, such as account limits and suggest contact messages to be sent to the customer, as well as the method of communication. Known collection systems feed account decisions, contact messages and methods to mailing systems for direct mail or people for telephone delivery.

Current commercially available software-based decision management systems apply predictive modeling techniques to customer data. Such a software-based decision engine may receive information from operational and/or customer information systems and data warehouses. This information is used to prioritize and tailor customer interactions based on predictive information, specific business rules, and continually evolving decision strategies. The decision engine then determines an appropriate action that is likely to be taken by a receivables system.

Currently, the appropriate actions are limited to direct mailings, in-person calls, recorded message delivery and one way electronic alerts such as e-mails. Typically, collection decisions are sent to customer contact representatives, or human agents who interact with customers about past due payments. A representative from the biller, bill consolidator, or third party will contact customers with delinquencies, overlimits or special status, to remind them of late payments, set up payment schedules, or receive promises to pay, or make other agreements. The customer may respond to the telephone contact by sending payment via direct mail or using electronic transfer, but such action cannot be completed over the telephone. The exception would be a bank calling regarding an overdraft on an account where the customer has multiple accounts with that institution and has the ability to transfer funds over the telephone. The contact is not customer-driven, and there is no capability for the customer to respond proactively to resolve the situation by completing, or arranging for, a payment through the interaction.

There are several varieties of electronic alerts currently available, but they are not self-driven, and there is no proactive response capability built in. For example, PCS devices offer weather, news and sports alerts via text messaging, and certain credit card companies currently send e-mail messages to remind customers of delinquent payments, overlimits or special status and upcoming penalties if the matter is not resolved. Certain banks provide triggered information alerts, or e-mail/fax notification if account balances fall below a certain level. However, once the notification is of a problem is received, the customer must use another channel to correct the situation, such as mail, dial-up, telephone or Internet banking.

FIG. 1 is a block diagram of a typical known automated receivables management system. A plurality of external systems 10 (such as an accounting systems, billing systems, credit bureau systems and data warehouses) monitor a data warehouse 12 and initiate a trigger when certain conditions are met. Such events may be automatically generated due to customer behavior or systematically produced at specified time intervals (i.e., monthly). Examples of events include a credit account delinquency, overlimit, statement cycle date, bounced check, or customer declaring bankruptcy. These external systems 10 pass the triggers and/or related data to a report database 14 and/or a decision engine 16. The report data base 14 can produce a variety of reports 20.

The decision engine 16, for example, the AMS STRATA™ system, applies predictive modeling techniques to customer data. The decision engine 16 receives information from the external systems 10 and outputs prioritized and tailored customer interactions based on predictive information, specific business rules, and continually evolving decision strategies. The decision engine 16 then determines appropriate actions to be taken by a collections system 18. The collection system 18 interfaces with a customer contact workstation 22 to carry out an appropriate collection action. An appropriate collection action may include, a specific collections procedure such as a late payment notice sent via regular mail and/or an agent-2Q assisted customer contact process facilitated by the customer contact workstation 22. The customer's response, either through the mail or via an agent-assisted customer contact process results in data being fed back to the data warehouse 12.

First, the decision engine 16 assigns a customer to a segment. A segment is a grouping of customers based on a set of characteristics to represent different objectives for the institution (grow, manage risk, prevent attrition). Generally, a segment is a high level segregation of customer for the purpose of associating a largely independent high level strategy. Based on objectives, a unique set of valuation and subsequent strategies are defined for each segment. For example, a collection system might segregate by product, having a segment for customers that have a late credit account payment and another for customers that have a delinquent mortgage payment.

Customer segments are then randomly divided into a control group and one or more test groups for the purpose of applying competing policy rules, strategies or experiments. Generally, test groups allow for strategy comparison. Just as in research environments, the behavior or outcomes of an experimental "test" population is compared to that of a "control" group not exposed to the experimental treatment. A strategist can specify what percentage of the customers should be randomly assigned to each test group. If the strategy associated with a test group is successful, that strategy may later be deployed to a larger percentage of the customers. Data regarding past tests and results is manually collected and fed back into the decision engine 16.

After customers are segmented and assigned to test/control groups, inbound events are matched to treatments to be used by the collection system 18. More specifically, the treatments to be invoked by each inbound event are defined. For example, different treatments are created for delinquent credit cards versus delinquent mortgages. This decisioning is performed using decision engine tables with defined treatment sequences, such as product type, amount of debt, length of delinquency, or value of the customer relationship. The order of treatment execution is also specified. For example, customers are divided into segments by product (credit card and mortgage), then by length of delinquency and then by customer value. Credit customers with delinquencies of more than 60 days, with low customer value will be sent to external collection agencies for processing. Credit customers with delinquencies of less than 60 days and high customer value will be called by a customer service representative to initiate payment arrangements.

Known collections systems 18, such as the AMS CACS™ product, manage a series of activities related to recovering outstanding debts from customers. The collection system 18 receives the customer segment and general strategy to be deployed from the decision engine 16.

The collection system then manages the exact workflow, processes and interactions between the institution and the customer. The collections system 18 feeds account decisions, contact messages and methods to queues associated with systems for direct mail or people for direct telephone delivery of the collections message. All customer contact, customer decisions and collections information is captured in the collection system and/or the data warehouse.

FIG. 2 is a flowchart of a known collection processes. In step S1 a trigger is issued by one of the external systems 10. Thereafter, in step S2, a customer strategy is determined by the decision engine 16 based on the trigger and associated information. Next, in step S3, a customer segment is identified. In step S4 customers are divided into control and test groups. Please note that this step is entirely optional.

The customers in the test and control groups are processed in step S5 with the formatting and delivery of a message to the customer. The messages can be given either by a direct mailing or by telephonic contact with a customer representative. In the event the customer does not respond, as in step S6, the process returns to step S2 for further consideration of strategy. However, the message results, hopefully, in customer interaction with a representative in step S7. In conjunction therewith, a record of the contact is made in step S8.

The customer will potentially make some promise of payment or actual payment in step S9. Thereafter, a confirmation message is sent to the customer in step S10 and the customer's account history is updated in step S11. In other words, the results of the customer interaction in step S9 are recorded in the collections system in step S11.

None of the known collection systems allow for an automated interactive session with the delinquent, overlimit or special status customer. Thus, all known collection systems must have human staff members to perform the customer interaction and receive customer responses and promises of payments. Thus, while VRU (Voice Response Units) and the system proposed by SolveMyDebt.com allow for the use of responses by punching keys on a telephone or keyboard, such input is limited to promises to pay and does not encompass interactive payment agreements or electronic methods for completing the agreements. Further, as set forth above, most systems utilize human operators to initiate customer contact. The present inventors have invented a system that enables a collection system to utilize modern electronic communication mediums to realize a fully automated collection system.

SUMMARY OF THE INVENTION

Accordingly, it is an object of the present invention to provide an automated receivables management system using an electronic network for customer contact and transaction execution and which provides a self-learning feedback loop to drive future strategy development.

It is also an object of the present invention to provide an automated receivables management system that manages the general receivable collections process electronically without requiring human intervention.

It is a further object of the present invention to provide an automated receivables management system that creates an automated test and learn environment, whereby collection messages sent and customer responses (or lack there of) are received, analyzed and future interaction is modified based on the effectiveness of previous interactions.

Additional objects and advantages of the invention will be set forth in part in the description which follows, and, in part, will be obvious from the description, or may be learned by practice of the invention.

The above objects of the present invention are achieved in an automated receivables management system that uses an electronic network to provide a self-service collection environment using an electronic network, such as the Internet or PCS, as a medium for communication and transaction execution. It provides comprehensive collections services in a fully automated fashion, including account decisioning, treatment specification, communication channel specification, and communication to the customer with a method for payment/response from the customer using the electronic channel. The electronic network operates as a fully-automated electronic receivables environment, providing a medium for notification, receiving funds and customer responses, enabling the creation of a test and control environment for experimentation on a customer level. The customer and client actions and responses are added to the customer relationship (account) history and used in the creation of new customer strategies, forming an environment to test new strategies and automatically incorporating new learning into new strategy creation.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
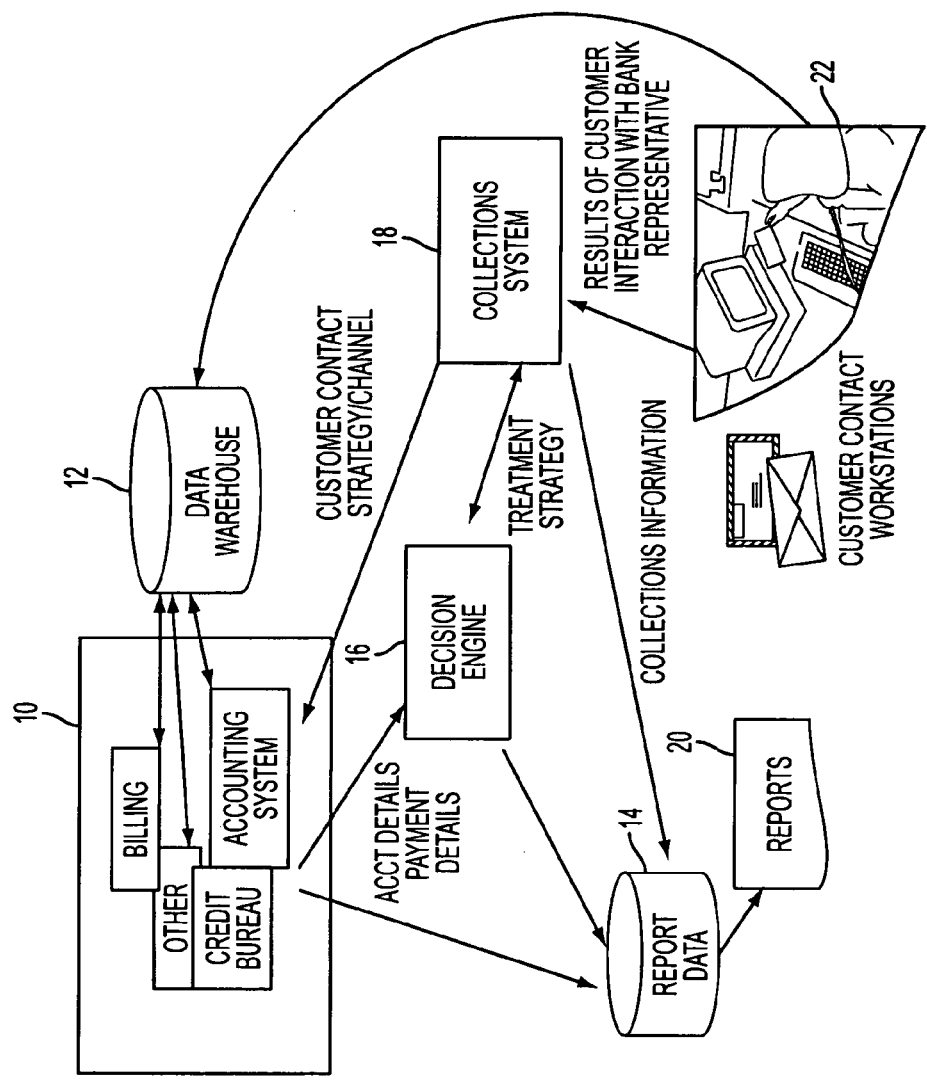
FIG. 1 is a block diagram of a typical known automated receivables management system.
Figure 2:
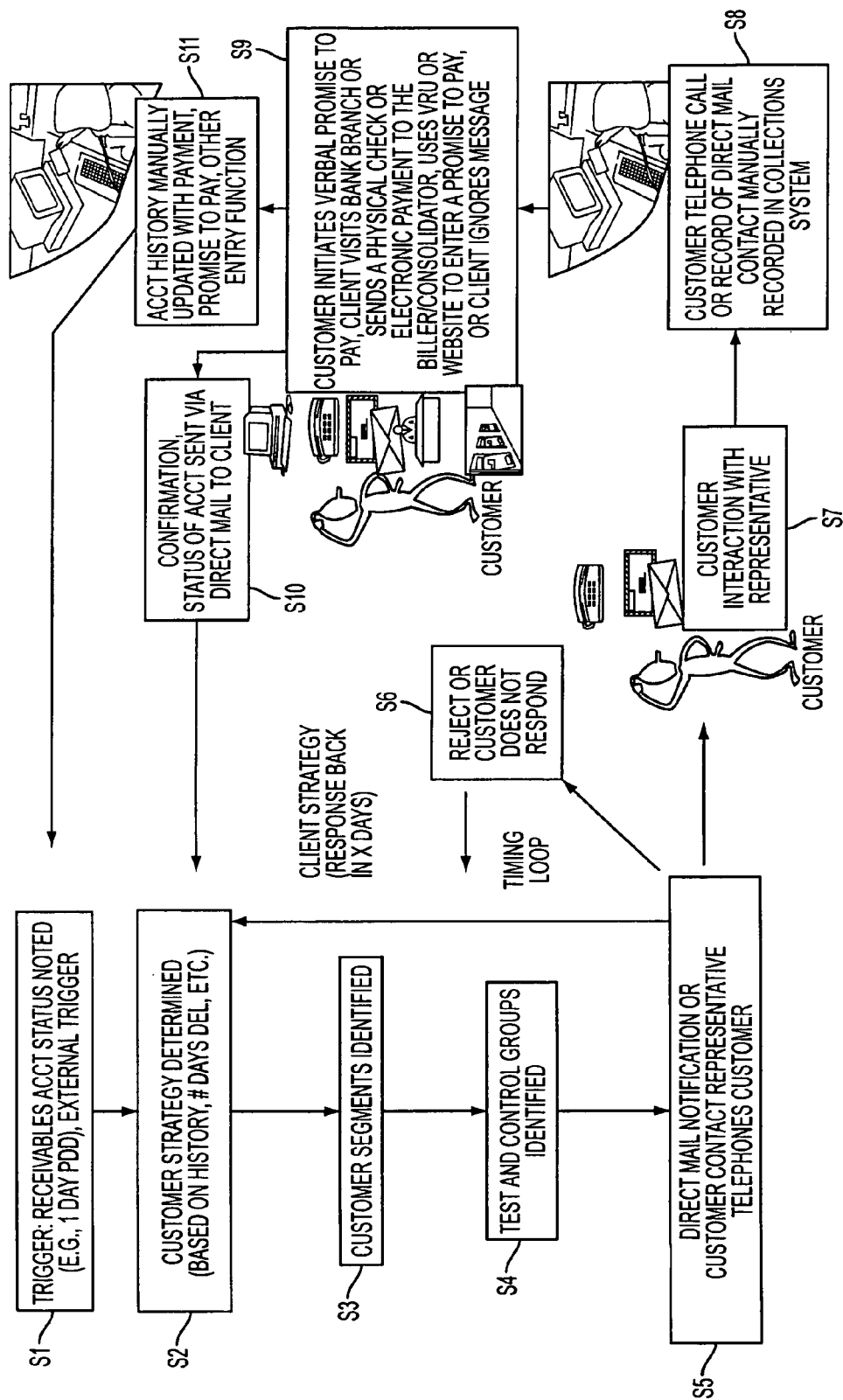
FIG. 2 is a flowchart of a known collection processes.

Reference will now be made in detail to the present preferred embodiment of the present invention, an example of which is illustrated in the accompanying drawings, wherein like reference numerals refer to like elements throughout.

The detailed description which follows is presented in terms of general processes, procedures and symbolic representations of operations of data bits within a computer memory, associated computer processors, networks, and network devices. The process descriptions and representations used herein are the means used by those skilled in the data processing art to most effectively convey the substance of their work to others skilled in the art. Processes are here, and generally, conceived to be a self-consistent sequence of steps or actions leading to a desired result. Thus, the term "process" is generally used to refer to a series of operations performed by a processor, be it a central processing unit of a computer or a processing unit of a network device, and as such, encompasses such terms of art as "procedures", "functions", "subroutines" and "programs."

In general, the sequence of steps in the process requires physical manipulation of data related to physical quantities.

Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities. In general, the present invention relates to method steps, software, and associated hardware configured to process electrical or other physical signals to generate other desired physical signals.

The apparatus set forth in the present application may be specifically constructed for the required purposes or it may comprise a general purpose computer or other network devices selectively activated or reconfigured by a computer program stored in the computer. The processes presented herein are not inherently related to any particular computer or other apparatus. In particular, various general purpose machines may be used with programs in accordance with the teachings herein, or it may prove more convenient to construct a more specialized apparatus to perform the required steps. While the present invention can certainly be realized on a so-called personal computer, including those employing the INTEL PENTIUM® architecture, any data processing device capable of performing the required operation may be used, including computers ranging from hand-held devices to main-frames. When used herein, means-plus-function language, in accordance with 35 U.S.C. § 112(6), typically encompasses a central processing unit (CPU) with associated software causing it to perform the described functions in conjunction with the CPU's associated hardware.

With respect to the software described herein, one of ordinary skill in the art will recognize that there exists a variety of platforms and languages for creating software for performing the processes outlined herein. One of ordinary skill in the art also recognizes that the choice of the exact platform and language is often dictated by the specifics of the actual system constructed, such that what may work for one type of general purpose computer may not be efficient on another type of general purpose computer. In practice, the present invention can be realized utilizing windows based architecture, such as WINDOWS 98° and WINDOWS NT®. Of course, this is only one example and other architectures, such as Unix or Apple, can be used depending upon the exact implementation of the present invention.

One of ordinary skill in the art to which this invention belongs will have a basic understanding of collection systems and basic programming skills. It being recognized that such practitioners do not require specific details of the software, but rather find process descriptions more desirable (due to the variety of suitable hardware and software platforms), such specifics are not discussed to avoid obscuring the invention.

An Automated Receivables Management System, in accordance with the present invention, provides the capabilities of existing systems with the additional ability to use an electronic network as a method of communicating receivables information, as a method for customer determination of the next action, of fully-automated electronic interactive collections environment, and to enable automated test and control experimentation at the customer level.

Figure 3:
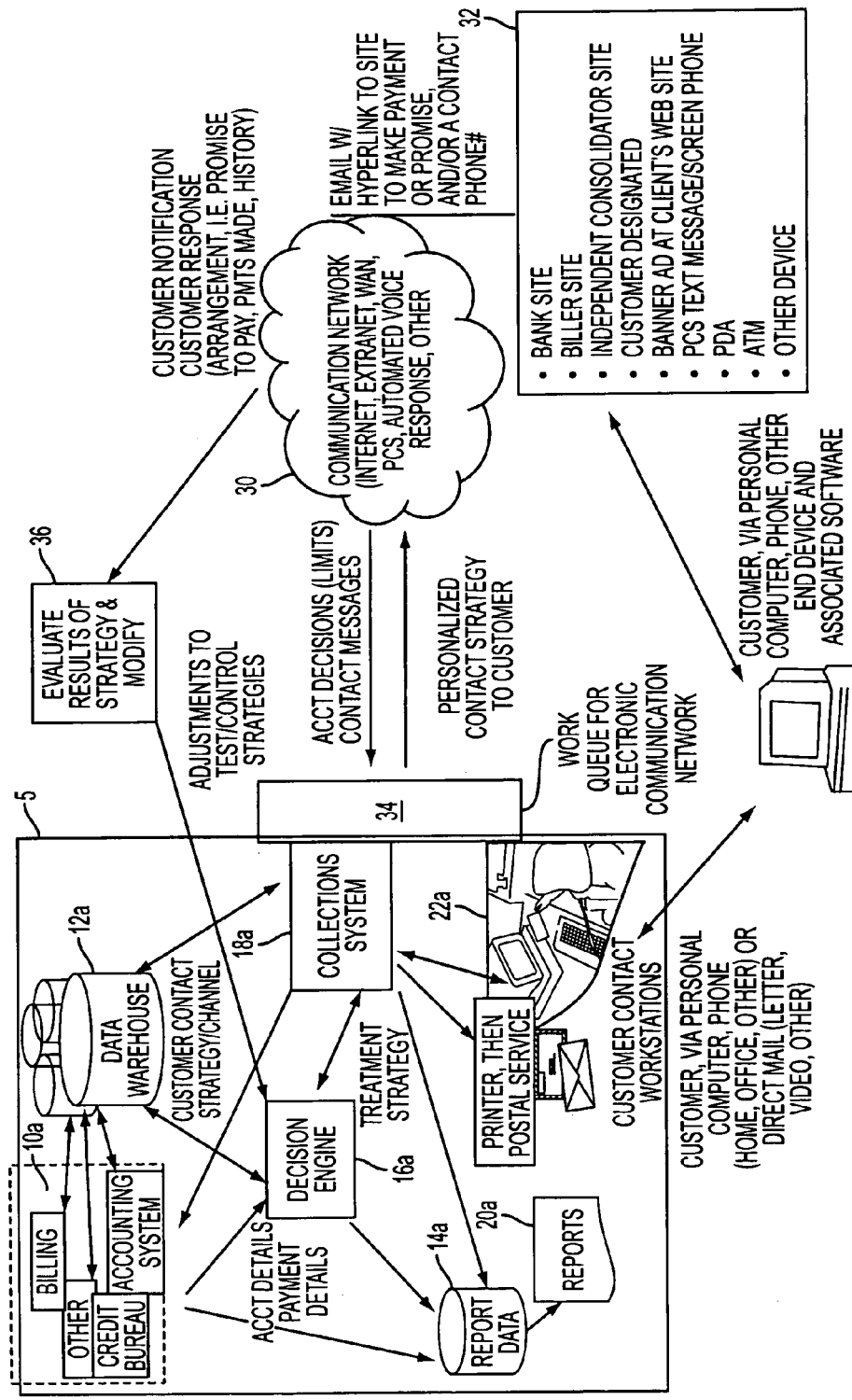
FIG. 3 is a block diagram of an automated receivables management system in accordance with a preferred embodiment of the present invention.

FIG. 3 is a block diagram of an automated receivables management system in accordance with a preferred embodiment of the present invention. The present invention provides an electronic communication path between the customer and a collection system 18a capable of being fully automated. Specifically, the collection system 18a can communicate with the customer using a variety of presently available (and any subsequently available) communication networks 30, such as the Internet, Intranets, extranets, WANs, PCS, automated voice response systems, and other communication mediums. More particularly, the present invention provides the ability to e-mail or otherwise electronically send a notice to the delinquent, overlimit or special status customer including a hyperlink to an interactive site 32, such as a web site, a PCS (personal communication system) message, and/or a variety of other interactive communication links, allowing the customer to electronically make a payment or promise to pay, along with a contact phone number if the customer requires in-person consultation. The interactive site is viewable by a customer using a personal computer, PDA or other device 38. More specifically, the communication network 30 is an electronic network such as the Internet, LAN, WAN, PCS, ATM (automated teller machine), or other system of hardware, software and connectivity that enables communication between components in different geographic locations.

The electronic interaction may be monitored by an evaluation program 36 which evaluates the results of the various activities, using, for example, the test group paradigm set forth above, and automatically updates the decision engine 16a with the results.

One of the logical ways to view the invented system is as an add-on to the known automated receivables management system. In FIG. 3 the section of the invented collection system corresponding to the known automated receivables management system shown in FIG. 1 is shown in block 5. As with the known collection system, the invented system includes a collection of external systems 10a (such as an accounting systems, billing systems, and credit bureau systems) that monitor a data warehouse 12a and initiate a trigger when certain conditions are met. In this case the data warehouse 12a stores both traditional customer contact and historical account information, as well as new information provided through electronic network. New information can include, but is not limited to, e-mail addresses, contact web sites, text messages from customers and click-through streams. The external systems 10a pass the triggers and/or related data to a report database 14a and/or a decision engine 16a. The collection system 18a may be constructed with a plurality of work queues. Typically, for each type of interaction a queue is created. Thus, known collection systems 18 have a queue for printing and mailing and a variety of queues for telephone calls, using known technology. The present invention adds a work queue for electronic communication 34 which uses a network 30 as the communications medium.

The Automated Receivables Management System provides the capabilities of existing systems, but with functionality over an electronic network 30. In addition, it also provides the ability to use an electronic network 30 as a method of communicating receivables information, as a method for customer determination of the next action, of fully-automated electronic interactive collections environment, and to enable automated test and control experimentation at the customer level. The collection system 18a provides account decisions, contact messages, and mode of contact to an e-mail server, web server or other electronic network servers (through a security firewall if applicable). The strategies may also provide for traditional customer contact representatives to follow up in cases where electronic collection attempts have failed.

The decision engine 16a applies predictive modeling techniques to customer data. The decision engine 16a receives information from the external systems 10 and outputs prioritized and tailored customer interactions based on predictive information, specific business rules, and continually evolving decision strategies. The decision engine 16a then determines appropriate actions to be taken by a collections system 18a. In accordance with the present invention the possible actions are expanded to include electronic interaction with the customer utilizing the networks 30 and interactive sites 32 in addition to the traditional printing and mailing services 22a. In other words the decision engine 16a and collections systems 18a may be based on existing systems with the added option of using electronic interfacing via the networks 30. Depending on the underlying system, this may be accomplished by adding additional queues to the collection system 18a to handle the electronic interaction option, such as via e-mail.

In the case that the collection system 18a sends account decisions (e.g., account limits), or contact messages to the e-mail server, an e-mail will be sent to a specified customer contact e-mail address. The e-mail message will contain the appropriate receivables message, such as a reminder that a credit account payment is due, with a hyperlink to a web site to make payment or to initiate a promise to pay. The hyperlink may link to a dynamically created custom web site or the web site of the bank, biller, or an independent consolidator site (i.e., payment processor site) or may link to another electronic network, such as a PCS, providing a method for electronic customer resolution. Additionally, e-mail, or other electronic messages, may contain a contact telephone number to initiate payments, promise to pay, or other responses via voice system or speaking to a customer contact representative.

Figure 4:
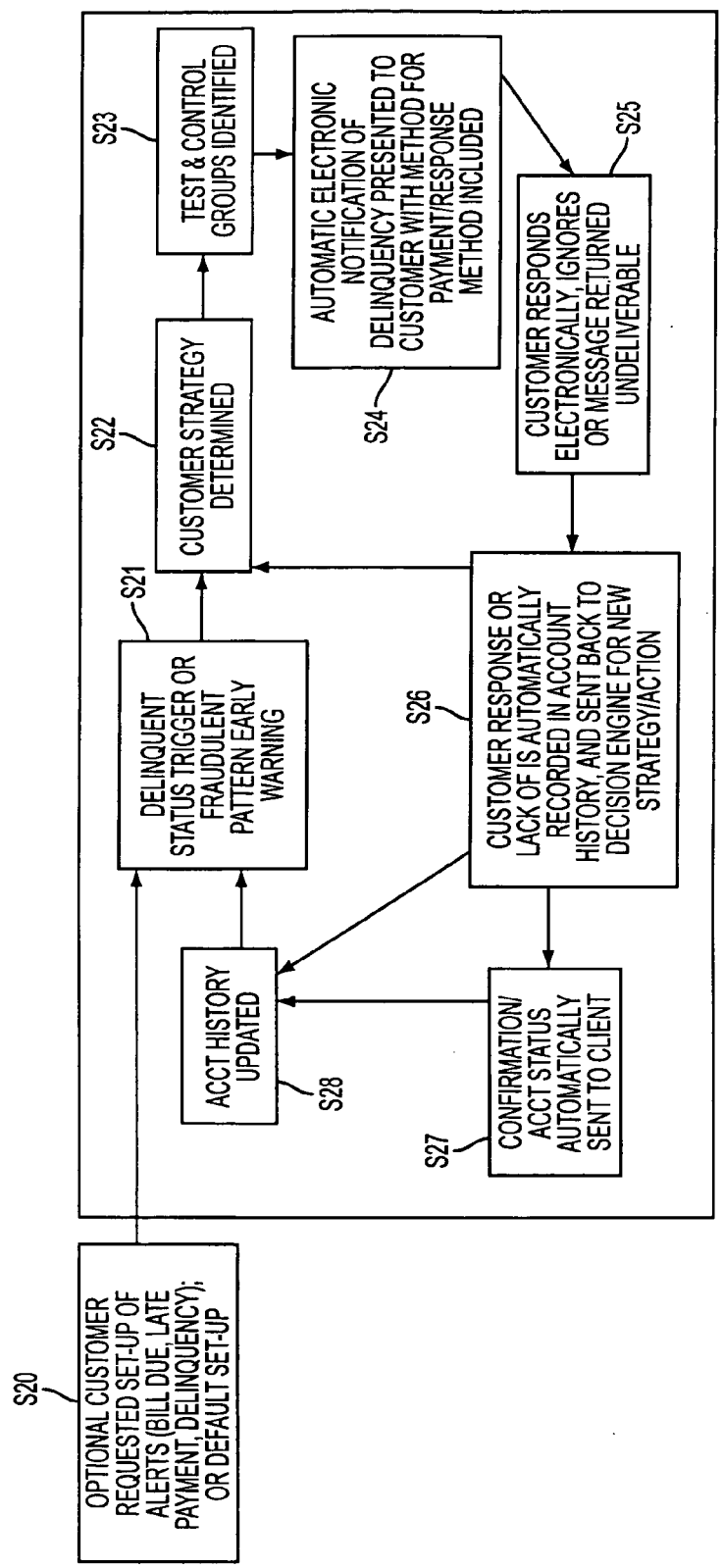
FIG. 4 is a high level process flow chart of the automated receivables management system in accordance with the preferred embodiment of the present invention.

FIG. 4 is a high level process flow chart of the automated receivables management system in accordance with a preferred embodiment of the present invention. In step S20 a customer agrees (optionally) to the use of electronic interaction on his account. The customer provides the required information, such as an e-mail address, to receive various notices including bills, late payment, delinquency and overlimit notices.

In step S21 a trigger is generated by one of the external systems 10a to initiate some form of collection activity. The decision engine 16a receives the notification of the trigger and determines a customer strategy in step S22. Next, in step S23, test and control groups are identified and the customers group is determined. It is assumed, for present purposes, that the customer is placed in a group with electronic interaction as the medium for communication. Next, in step S24, the customer is sent an electronic notification of his or her delinquency, overlimit or special status. Electronic notification can take place over a variety of media using a variety of known programs and hardware. For example, the message could be via Internet based e-mail (which may include text imaged and/or sound) allowing the use of, for example, Netscape Communicators at the customers end as a vehicle for the communication. Preferably, the electronic message sent in step S24 will provide a means for reverse communication in step S25, such as a return e-mail, an embedded hyperlink allowing the customer to click the link and open an associated web-page, or some script for a PCS allowing interaction.

In step S26, the customers response (including non-response) will be recorded, the data warehouse 12a updated and the response evaluated by the evaluation program 36. The customer's account history is updated in step S28.

Finally, a confirmation of the interaction may be sent to the customer in step S27 and a notation made in the customer's account history in step S28.

Figure 5:
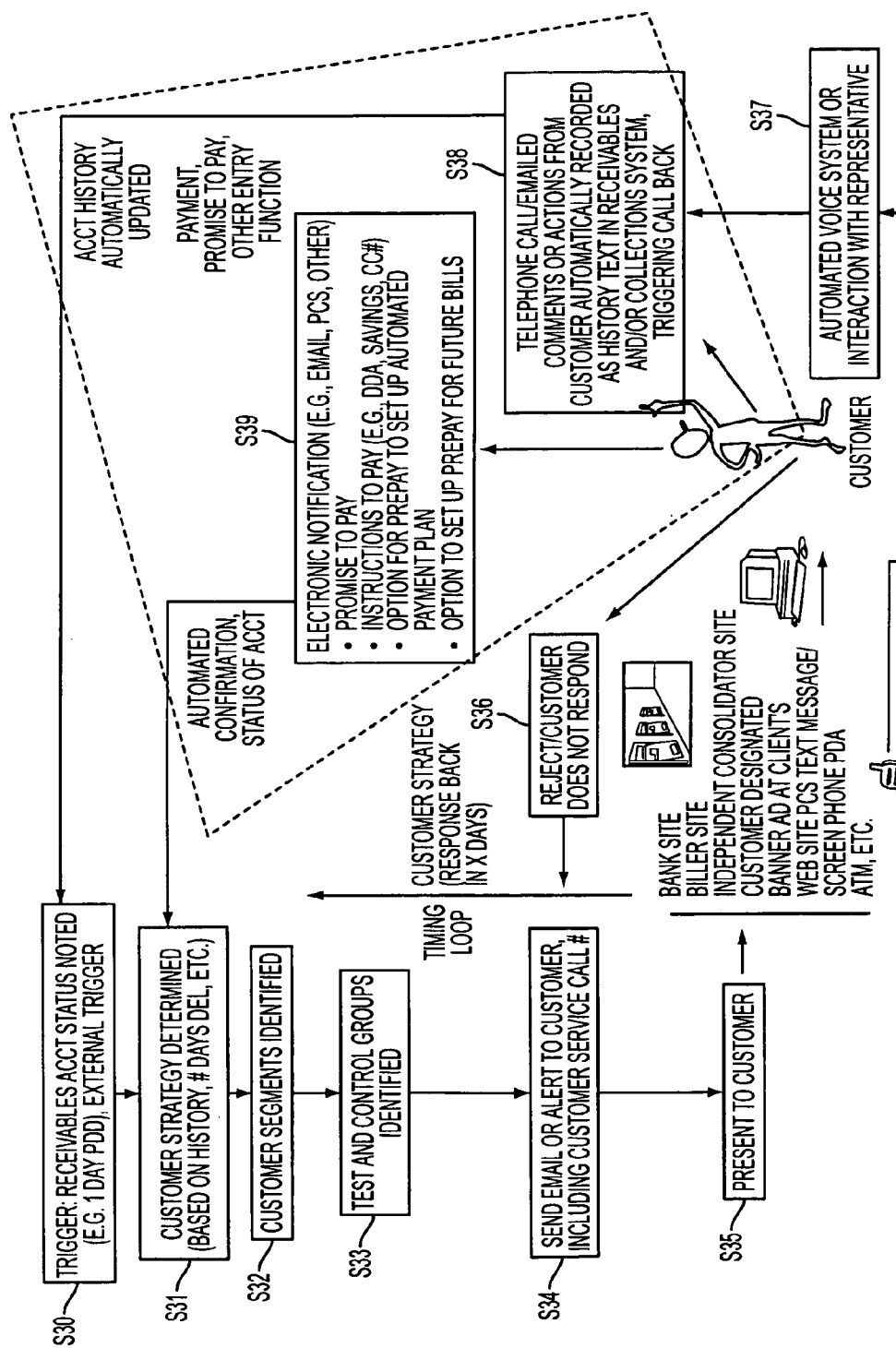
FIG. 5 is a detailed process flow chart of the automated receivables management system in accordance with the preferred embodiment of the present invention.

FIG. 5 is a detailed process flow chart of the automated receivables management system in accordance with a preferred embodiment of the present invention. In step S30 a trigger is issued by one of the external systems 10a. Thereafter, in step S31, a customer strategy is determined based on the trigger and associated information. Next, in step S32, a customer segment is identified. In step S33, customers are divided into control and test groups. Please note that steps S32 and S33 are entirely optional.

The customers in the test groups and control groups are processed in step S34 with the formatting of a message for delivery to the customer via e-mail or another electronic interaction. Preferably, the way the customer is supposed to contact the system is included in the message, for example a customer service call # or web address. As noted above, it is preferable to include a hyper-link directing the customer to a web site allowing interaction regarding his or her account.

In step S35 the customer, following the link in the e-mail, or other message, is presented with a web site or other form of electronic interaction. For example the customer could be presented with a message formatted as an alert or banner ad on the Bank's (or other billing entity's) web site, the customer's own web site; a PCS screen or a PDA (personal data assistant) screen, for example using a wireless network, or even a custom screen on an ATM.

One of the preferred method involves the creation of a custom web page to be accessed by the customer. This can be accomplished by those of ordinary skill in the art utilizing existing tools, such as MICROSOFT® FRONTPAGE®, BROADVISION® ONE-TO-ONE ENTERPRISE™, and MICROSOFT VISUAL J++™. The web server, or associated program, will interface with the collections system 18a to present the customer with adequate information and a list of acceptable responses. This can be accomplished in a variety of manners, the exact implementation of which will depend on the exact implementation of the remainder of the system. If the message comes through traditional interaction in step S35, customer response can be through automated voice system or interaction with a customer representative in step S37. While such interaction is also a possible response, other responses may be more preferred, such as an electronic response, such as e-mail or web-based response in step S38. If no response is received this is noted in step S36 and the process returns to step S31 for further consideration.

An electronic response can include a promise to pay, instruction to charge some account, instructions to set up an automated payment plan or other payment plan. As noted above, for interactions taking place using web-based, ATM, PCS or other electronic technology, appropriate responses can be pre-programmed, or dynamically selected, such that the customer need only select an appropriate response. The allowed appropriate responses are generated as in the prior art. Known systems which recommend and then validate the appropriateness of a customer's response, as could be achieved through a Promise Advisory, may be employed. The Promise Advisor is a computer-based promise option advisory module, sold by AMS, provided in a promise management system which interfaces to a collection system, and which speeds up collection account activity processing by proactively recommending to a user appropriate payment promise terms available for each customer or account holder. Also, using web-based technology, the customer can be presented with educational material in addition to the list of possible responses. Subsequently, the response is entered into the customer's account history and the customer is sent a confirmation. The customer strategy is updated with the new information.

In step S39, the response from the customer is analyzed to determine if further activity is required, such as an in-person call back. The customer's account history is then updated with this information.

Figure 6:
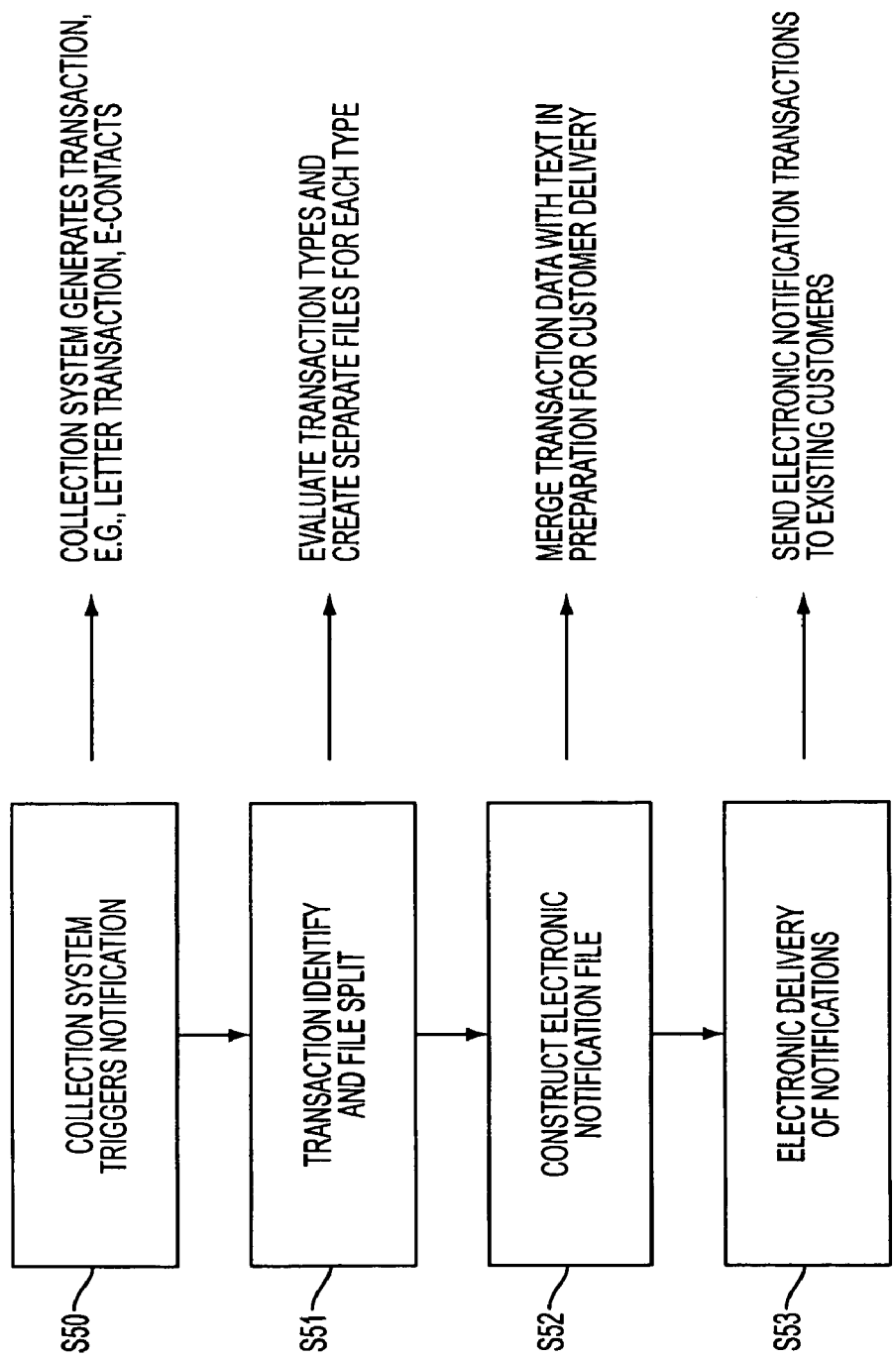
FIG. 6 is a process flow chart of the electronic notification process.

FIG. 6 is a process flow chart of the electronic notification process. In step S50, the decision engine 16*a* responds to a trigger generated by an external system 10*a* and notifies the collection system 18*a* that an electronic interaction should be tried with certain parameters. In step S51, the transaction with the customer is evaluated and a file is created for each type of transaction. For example, a file will be created for all e-mail transactions, another will be created for phone queues, and a third will be created for direct mailings. Next in step S52, an electronic notification file is created by merging transaction data with the appropriate text for electronic interaction, such as a personalized message including a hyper-link to a response site. Finally, in step S53, the electronic notification is transmitted to the customer.

Figure 7:
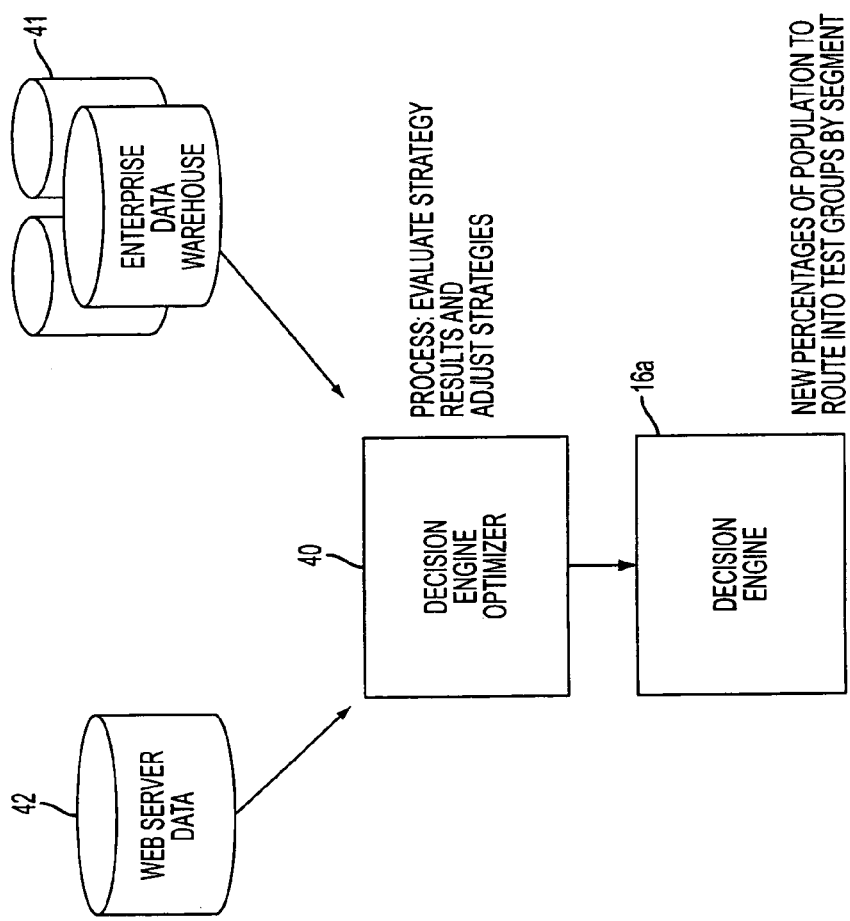
FIG. 7 is a block diagram of the evaluation program shown in FIG. 3.

FIG. 7 is a block diagram of the evaluation program 36. The evaluation program uses a decision engine optimizer 40 to evaluate strategy results and adjust strategies. This process may be formed using an automated strategy optimization software (as described in U.S. patent application Ser. No. 09/348,161 DECISION MANAGEMENT SYSTEM WITH AUTOMATED STRATEGY OPTIMIZATION), which feeds a decision engine, such as the AMS STRATA® product. In general, alternative interaction strategies are identified and assigned a percentage of customers to test. The decision engine optimizer 40 uses a variety of information sources, contained within the databases that comprise an enterprise data warehouse 41, which may be part of the data warehouse 12*a*. The decision engine optimizer 40 also accesses a web server database 42 which holds the results of the interaction with the customer. Where the interaction takes place over mediums other than a web server, the central process can access the warehouse database 12*a* directly.

In operation, the evaluation program 36 stores all contact messages, customer responses (including payments, promises to pay and other messages) in the data warehouse 12*a* for use in future strategy creation. Test and control group responses and success rates are tracked for strategy comparison. If the strategy associated with a test group is successful, that strategy may later be deployed to a larger percentage of the customers. Automated optimization software, such as the AMS STRATA® product will be used to modify the strategies to improve performance through the use of alternate or hybrid (a new strategy that will outperform either/both the test strategy or the control strategy by combining the best performing actions of each strategy) strategies. The strategies are automatically revised to create new strategies, fully automating the test-and-learn environment.

Although the preferred embodiment of the present invention has been described with respect to a specific configuration, it will be recognized that the preferred embodiment is not limited to the specific configuration. For example, the system architecture may vary in terms of the location of software and functionality on the system hardware. The decision engine 16*a* and collection system 18*a* may be an integrated system. The data warehouse 12*a* may provide central data storage, with subordinate databases containing system-specific data, such as an on-line transaction processing database. Certain or all collections functions and software may reside on a Web server forming part of the network 30. In this case, certain or all decision functions and software may reside on the Web server. Please note that servers other than Web servers may be used. Firewalls or other security devices may be used as deemed necessary. Other end-user devices may be used in addition to PC, laptop, PCS, PDA, and ATM. A bill collector may be a third party organization that collects receivables from multiple biller organizations to present in a consolidated fashion at a third party web site.

The exact flow of information will vary according to the systems in place and the needs of organizations implementing the automated receivables management system, and according to the system application and structure changes noted above (e.g., interfaces to external systems may vary). Additionally, strategies may or may not be modified during each iteration, as implementation of a strategy may involve several collections steps that do not require redecisioning as an interim step, and customer contacts and responses may occur in different sequences depending on the process in place and the strategies being tested.

What is claimed is:

1. An automated receivables management system owned or controlled by a credit grantor that granted to a customer of the credit grantor a credit account having been designated for collection by the credit grantor, the system comprising:
   a collection system that implements a collection action by automatically creating an electronic message to send to the customer associated with the account designated for collection, where the message includes interactive content for allowing the customer to interactively respond to the message with an electronic promise to make a payment, and where the interactive content also allows the customer, if they chose, to make an electronic payment toward the promise through the communication network;
   a communication server that automatically sends the electronic message to the customer associated with the account designated for collection via the communication network; and
   an electronic communication device that receives, over the communication network, an electronic response from the customer associated with the account designated for collection, where the electronic response comprises an electronic promise to make a payment, and where the electronic response was made by the customer interacting with the interactive content in the electronic message.

2. An automated receivables management system, as set forth in claim 1 wherein:
   said electronic message includes a web address; and
   said electronic communication device comprises a web server serving a web page containing information about delinquency of the account designated for collection, including acceptable responses, at an address indicated in the electronic message.

3. An automated receivables management system, as set forth in claim 2 wherein said electronic message is one of an e-mail, a personalized web page, and a PCS message, a voice mail and an electronic message for matted for receipt by a PDA.

4. An automated receivables management system, as set forth in claim 1 wherein said electronic message is one of an e-mail, a personalized web page, a PCS message, and an electronic message formatted for receipt by a PDA.

5. An automated receivables management system, as set forth in claim 1 further comprising:
a decision engine that reviews an account history of the account designated for collection and determines an appropriate form for the electronic message.

6. An automated receivables management system, as set forth in claim 5 further comprising:
an evaluation program that receives an indication of the response from the customer of the account designated for collection and evaluates the response to identify successful forms of the electronic message and web site.

7. An automated receivables management system, as set forth in claim 1 further comprising:
an evaluation program that receives an indication of the response from the customer designated for collection and evaluates the response to identify successful collection activities.

8. The system according to claim 1, wherein the response contains information that is activated by the customer associated with the account to actuate electronic payment of a debt that has caused the account to be designated for collection.

9. An automated receivables management system, as set forth in claim 1, further comprising a decision engine receiving from external systems of the entity information regarding accounts of the credit grantor, determining tailored customer interactions corresponding to the accounts, and determining appropriate actions to be taken on the accounts by the collections system from one of traditional printing and mailing services and electronic interaction.

10. A method for automatically collecting accounts designated for collection, the method being performed by a credit grantor that granted to a customer of the credit grantor a credit account having been designated for collection by the credit grantor, the method comprising:
identifying automatically an account designated for collection;
determining automatically interactive content of a message to the customer of the account designated for collection, where the interactive content allows the customer to interactively respond to the message with an electronic promise to make a payment, and where the interactive content also allows the customer, if they chose, to make an electronic payment toward the promise through a communication network;
sending automatically through the communication network to the customer of the account designated for collection the electronic message; and
receiving a response to the message via the communication network, where the response comprises an electronic promise to make a payment, and where the response was made by the customer interacting with the interactive content in the electronic message.

11. A method for collecting accounts designated for collection, as set forth in claim 10, further comprising:
evaluating the response and identifying successful methods for collecting accounts designated for collection.

12. A method for collecting accounts designated for collection, as set forth in claim 11, wherein the determining a content of a message uses the successful methods in making the determination.

13. A method for collecting accounts designated for collection, as set forth in claim 10, wherein the electronic message is one of an e-mail, a personalized web page, a PCS message, and an electronic message formatted for receipt by a PDA.

14. A method for collecting accounts designated for collection, as set forth in claim 10, wherein the electronic message includes a web address, and said receiving a response comprises:
creating a web page containing information about the account designated for collection including allowable responses; and
allowing the holder of the account designated for collection to access the web page at the web address and select an allowable response.

15. An automated receivables management system owned or controlled by a credit grantor that granted to a customer of the credit grantor a credit account having been designated for collection by the credit grantor, the system comprising:
collection means for implementing a collection action by creating an electronic message to send to the customer associated with the account designated for collection, where the message includes interactive content for allowing the recipient to interactively respond to the message with an electronic promise to make a payment, and where the interactive content also allows a recipient, if they chose, to make an electronic payment toward the promise through a communication network; and
communication means for sending the electronic message to the customer associated with the account designated for collection via the communication network and receiving a response to the message from the recipient associated with the account designated for collection, where the response comprises an electronic promise to make a payment, and where the response was made by the recipient interacting with the interactive content in the electronic message.

16. An automated receivables management system, as set forth in claim 15 further comprising:
decision means for reviewing an account history of the account designated for collection and determining an appropriate form of the electronic message.

17. An automated receivables management system, as set forth in claim 16, further comprising:
evaluation means for reviewing responses to the electronic messages and identifying successful collection methods; and
wherein said decision means is responsive to said evaluation means in determining an appropriate form of the electronic message.

18. An automated receivables management system, as set forth in claim 16, wherein said decision means also determines allowable responses and, responsive to said evaluation means, creates information for populating a web page presenting the allowable responses to the customer associated with the account designated for collection, and receiving an allowable response from the customer.

19. A computer readable medium encoded with automated receivables management software for a credit grantor, which granted to a customer of the credit grantor a credit account having been designated for collection by the credit grantor, to perform a process, the process comprising:
identifying automatically the account designated for collection;
determining automatically interactive content of a message to the customer associated with the account designated for collection, where the interactive content allows the customer to interactively respond to the message with an electronic promise to make a payment, and where the interactive content also allows the customer, if they chose, to make an electronic payment toward the promise through a communication network;

sending automatically through the communication network to the customer associated with the account designated for collection the electronic message; and receiving a response to the message via the communication network, where the response comprises an electronic promise to make a payment, and where the response was made by the customer interacting with the interactive content in the electronic message.

20. A method of automatically collecting debts performed by a credit grantor that granted to a customer of the credit grantor a credit account having been designated for collection by the credit grantor, the method comprising:

automatically designating an account for collection and a strategy for collecting on the account;

automatically creating and sending through a communication network an electronic collection activity message to the customer associated with the account, in accordance with the strategy, where the message includes interactive content that allows the customer to interactively respond to the message with an electronic promise to make a payment, and where the interactive content also allows the customer, if they chose, to make an electronic payment toward the promise through the communication network;

activating, by the customer interacting with the interactive content, an electronic response to the collection activity message, where the response is returned through the communication network, and where the response comprises an electronic promise to make a payment; and responsive to said activating, sending the customer information used to pay on the account.

21. A method of a creditor automatically conducting collection activity, comprising:

designating automatically, by the creditor, both a delinquent account for collection and a strategy for collecting on the account, where the account was granted by the creditor;

automatically composing and sending, by the creditor, through a communication network an electronic mail collection message to a person associated with the account, wherein said composing and sending is done in accordance with the strategy, and where the message includes a link to a collection web site accessible by the person over the communication network;

interacting, by the person, with the link in the collection message; and responding to said interacting by automatically accessing the collection web site over the communication network, where the collection web site includes interactive content that allows the person to make an electronic promise to make a payment, and where the interactive content also allows the person, if they chose, to make an electronic payment toward the promise through the communication network.

22. The method according to claim 21, further comprising:

electronically directing payment toward the promise or account by interacting with the web site;

receiving notification of said directing payment;

automatically evaluating the effectiveness of the strategy by analyzing the notification; and deriving a new strategy according to said evaluating.

* * * * *

UNITED STATES PATENT AND TRADEMARK OFFICE
CERTIFICATE OF CORRECTION

PATENT NO. : 7,006,994 B1
APPLICATION NO. : 09/356047
DATED : February 28, 2006
INVENTOR(S) : Stephen J. Campbell et al.

It is certified that error appears in the above-identified patent and that said Letters Patent is hereby corrected as shown below:

Col. 4, line 11, delete "agent-2Q assisted" to --agent-assisted--, therefor.

Col. 7, line 44, delete "98 " and insert --98®--, therefor.

Col. 9, line 57, delete "Communicators" and insert --Communicator®--,therefor.

Signed and Sealed this

Twenty-fifth Day of July, 2006

JON W. DUDAS
*Director of the United States Patent and Trademark Office*